Figure 1:
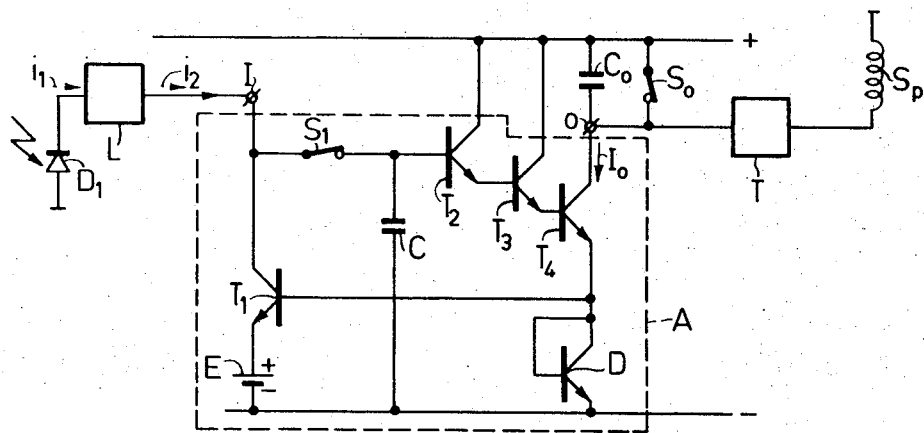

United States Patent [19]
Mulder

[11] 3,808,463
[45] Apr. 30, 1974

[54] INTEGRATED FUNCTION GENERATOR

[75] Inventor: Cornelis Mulder, Emmasingel, Eindhoven, Netherlands

[73] Assignee: U.S. Philips Corporation, New York, N.Y.

[22] Filed: Aug. 21, 1972

[21] Appl. No.: 282,356

[30] Foreign Application Priority Data
Aug. 21, 1971 Netherlands .................. 7111555

[52] U.S. Cl. ............ 307/230, 95/10 CD, 95/10 CE, 95/10 CT, 307/230, 307/246, 317/235 R, 330/28
[51] Int. Cl. ............................................. H03g 3/30
[58] Field of Search .......... 307/230, 246; 95/10 CE, 95/10 CT, 10 CD; 330/28

[56] References Cited
UNITED STATES PATENTS

| 3,194,985 | 7/1965 | Smith et al. | 307/88.5 |
| 3,436,670 | 4/1969 | Solomon | 330/28 |
| 3,672,753 | 6/1972 | Nobusawa | 352/91 |
| 3,239,694 | 3/1966 | Rovell | 307/88.5 |
| 3,319,079 | 5/1967 | Matsumoto | 307/88.5 |
| 3,331,029 | 7/1967 | Banasiewicz et al. | 330/25 |
| 3,374,362 | 3/1968 | Miller | 307/230 |
| 3,392,287 | 7/1968 | McFadyen et al. | 307/230 |
| 3,600,689 | 8/1971 | Hutcheon et al. | 328/127 |
| 3,609,394 | 9/1971 | Lennox et al. | 307/230 |
| 3,652,871 | 3/1972 | Delagrange | 307/230 |

FOREIGN PATENTS OR APPLICATIONS
44-19,749   8/1969   Japan .............................. 95/10 CT

*Primary Examiner*—Rudolph V. Rolinec
*Assistant Examiner*—Joseph E. Clawson, Jr.
*Attorney, Agent, or Firm*—Frank R. Trifari; Bernard Franzblau

[57] ABSTRACT

The integrated circuit described is a function generator which, for example, is eminently suited for use in a shutter system of an automatic photographic camera. The current which is delivered by the photodiode and is a measure of the intensity of the light incident on the objective of the camera is supplied to this function generator as the input current. This current is converted, by means of a voltage which is generated in the generator and is a function of the film speed of the film used and the diaphragm stop, into an output current which is supplied to an integrating circuit. The value of the said output current and the integrating circuit then determine the exposure time.

14 Claims, 3 Drawing Figures

INTEGRATED FUNCTION GENERATOR

The invention relates to an integrated circuit for producing an output current which is in a predetermined non-linear relationship to an input current and from an operating instant retains the predetermined relationship to the last value of the input current prior to the instant, irrespective of further variations of the input current.

The aforementioned circuit may be used, for example, in a shutter system for a photographic camera, which system serves for automatic setting of the exposure time. In reflex camera's, for example, the light is measured behind the objective by means of a mirror which directs a fraction of the light incident on the objective on to a photosensitive element, for example a CdS cell, which usually is accommodated in the viewfinder of the camera. The photosensitive element then delivers a current which is proportional to the light incident on the element. This current is supplied as the input current to the aforementioned circuit. This circuit then delivers an output current which is in a predetermined non-linear relationship to the input current. The non-linear relationship is determined by the sensitivity, or speed, of the film used and by the size of the diaphragm aperture or stop. When the shutter trigger of the camera is pressed, the mirror is lifted up. After the mirror has been lifted up, the output current is supplied to an integrating capacitor which is connected to a flip-flop circuit which in turn is connected to the shutter. When the voltage across the capacitor exceeds a given value, the flip-flop will change state, causing the shutter to be closed. The time interval between the instant at which the mirror is lifted and the instant at which the shutter closes after the flip-flop has changed state is referred to as the exposure time. During this exposure time, i.e., when a photograph is being made, the mirror is in the lifted position so that the photosensitive element receives no light. Hence the input current to the said circuit is equal to 0 amperes. Consequently means must be provided in this circuit to retain the predetermined relationship between the output current and the last value of the input current prior to the operating instant, at least during the exposure time and the time during which the mirror is lifted up.

In a known circuit of the type described the input current is converted by means of diodes into an input voltage which is applied to one input of a differential amplifier. To the other input of the differential amplifier a voltage is applied which is a function of the speed of the film used and the stop. The output voltage from the differential amplifier is applied to a storage capacitor. By means of a double-pole switch this storage capacitor then is disconnected from the differential amplifier and connected into a second portion of the circuit. The latter portion includes an amplifier the output of which is connected to an integrating capacitor to which the output current of the circuit is supplied. After the change-over of the double-pole switch, the said storage capacitor has one terminal connected to the input of the amplifier and the other terminal to a compensating network which ensures, amongst other things, that the voltage between the input of the amplifier and the network is equal to 0 volts before the storage capacitor is connected into the second portion.

In the aforedescribed circuit, the differential amplifier produces a differential voltage, the value of which is determined by the luminous intensity measured, the speed of the film used and the stop. At high luminous intensities this differential voltage will be small, for example, 2 mV, and hence will be highly sensitive to variations in the parameters of the amplifier such as, for example, the offset voltage and the collector-base current gain factors of the transistors used. These variations in the parameters cause an error voltage to be added in the storage capacitor to the correct differential voltage. As a result, the actual exposure time will not be equal to the exposure time which corresponds to the luminous intensity measured, the film speed and the stop. This means that the film will be either over-exposed or under-exposed, depending on the polarity of the error voltage.

The aforementioned circuit effectively comprises two independent portions, a first portion for generating the control voltage and a second portion for generating the output current. During the measurement of the luminous intensity and the generation of the control voltage for the second portion, the storage capacitor forms part of the first portion. After the double-pole switch has been thrown over, the storage capacitor forms part of the second portion. Owing to the fact that the known circuit comprises two independent portions in general many components are required. This is particularly undesirable in integrated circuits because it entails higher cost in the manufacture of masks and a lower rate of production and, what is more important, the use of an area of the semiconductor chip which might better be used for other circuits. The fact that the storage capacitor initially forms part of the first portion of the circuit and then of the second portion also increases the likelihood of error voltages. To the aforementioned error voltage due to the variations in the parameters of the differential amplifier of the first portion there is added an error voltage which is due to the fact that the voltage at the input of the amplifier of the second portion of the circuit never will be exactly equal to the voltage across the aforementioned compensating network.

Summing up, it may be stated that the stepwise generation of the output current gives rise to two error voltages, on the one hand an error voltage produced during the generation of the control voltage across the storage capacitor in the first portion of the circuit, and on the other hand an error voltage produced during the generation of the output current in the second portion of the circuit by means of the control voltage generated.

It is an object of the invention to provide a solution of the said problems, and the invention is characterized in that the circuit includes an amplifier provided with negative feedback from the output of which the output current may be derived, the negative-feedback impedance being connected via a switch to the input of the amplifier and determining the prescribed non-linear relationship between the input current and the output current, whilst furthermore means are provided for connecting the said input to a storage capacitor for maintaining the said relationship when the switch is opened.

Figure 2:
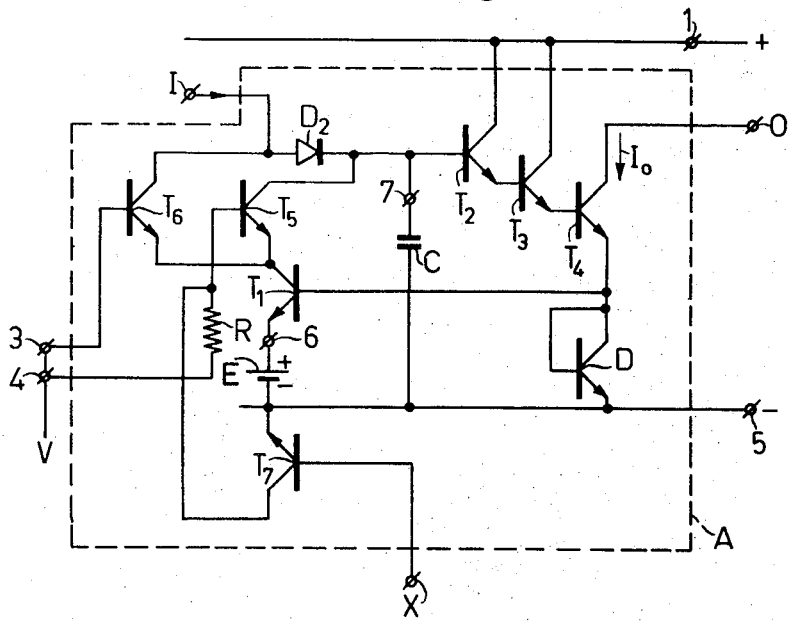
Figure 3:
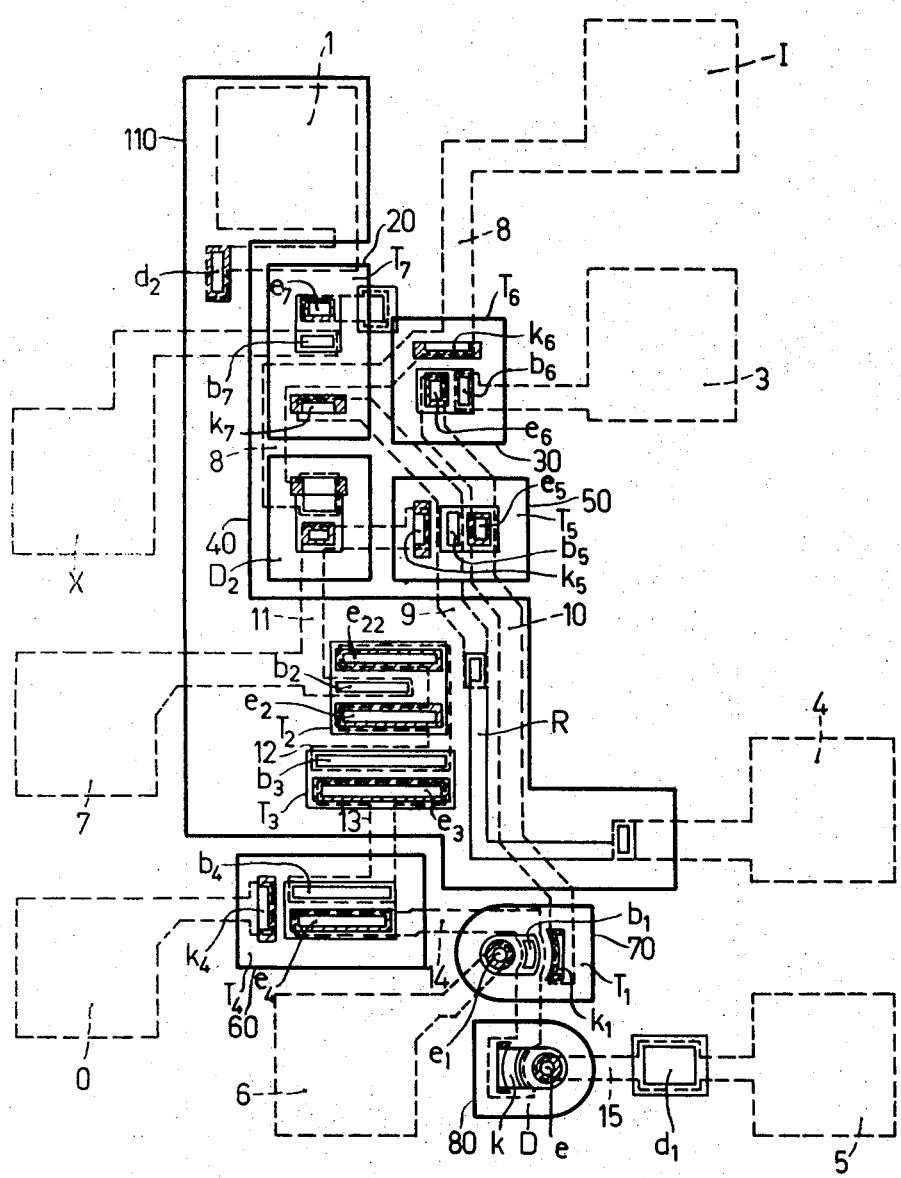

Embodiments of the invention will now be described, by way of example, with reference to the accompanying diagrammatic drawings, in which:

FIG. 1 is a circuit diagram of a first embodiment of the circuit according to the invention, FIG. 2 is a circuit diagram of a second embodiment of the circuit according to the invention, and FIG. 3 shows a layout of the integrated circuit shown in FIG. 2.

The embodiment of the circuit according to the invention shown in FIG. 1 is a shutter system for a photographic camera provided with automatic exposure time control. The shutter system shown includes a photodiode $D_1$ which is connected to the input of an amplifier L. The output of this amplifier is connected to the input I of a circuit A having an output terminal O which is connected to an integrating capacitor $C_o$. This capacitor is shunted by a switch $S_o$. The output O of the circuit A is also connected to the input of a flip-flop T the output of which is coupled to a shutter coil $S_p$. The circuit A includes an amplifier which comprises transistors $T_2$, $T_3$ and $T_4$. The negative-feedback impedance is constituted by a current source comprising a diode D, a transistor $T_1$ and a voltage supply source E. This current source is included in the negative-feedback loop of the amplifier. The base emitter paths of the transistors $T_2$, $T_3$ and $T_4$ are connected in series via the diode D to a first voltage supply point $(-)$. The base of the transistor $T_1$ is connected to the emitter of the transistor $T_4$, and the emitter of the transistor $T_1$ is connected via the voltage source E to the said first supply point. The collector of the transistor $T_1$ is connected to the base of the transistor $T_2$ via a switch $S_1$. A storage capacitor C is connected between the base of the transistor $T_2$ and the first supply point. The collectors of the transistors $T_2$ and $T_3$ are connected to a second supply point $(+)$. The collector of the transistor $T_4$ forms the output terminal O of the circuit. The shutter system operates as follows: The photodiode $D_1$ serves as a measuring element for converting the incident light into an electric current. Hence it preferably is a silicon photodiode because of the good properties of such a diode in respect of leakage current (dark current), independence of temperature and especially high response speed. The current $i_1$ generated by the photodiode $D_1$ is supplied to the amplifier L which delivers an amplified output current $i_2$. This current $i_2$ is supplied as input current to an input I of the circuit A. The voltage source E delivers a voltage which is a function of the speed of the film used and of the stop set. Each successive stop of a normal camera gives a change in the light intensity and hence in the exposure time by a factor of 2. Every 3 DIN units of film speed give a change in speed by a factor of 2. The exposure time may be expressed by:

$$t = k'/L_2^{\frac{1}{3}(f+d)}$$

(1)

where $k'$ is a constant, L is the luminous intensity, $f$ is the film speed in DIN and $d$ is the diaphragm stop. The voltage supply E delivers a voltage which is equal to $$V = n\, kT/q\, \ln 2$$

(2)

where T is absolute temperature in degrees cnetigrade, $q$ is the elementary charge, $n = \frac{1}{3}(f+d)$ and $k$ is the Boltzmann constant. Further we have the relationship:

$$V_1 - V_D = n\, kT/q\, \ln 2 = kT/q\, \ln I_o/i_2$$

where $V_1$ is the base emitter voltage of the transistor $T_1$ and $V_D$ is the base emitter voltage of the transistor D which is connected as a diode.

From this it follows that the non-linear relationship between the output current $I_o$ and the input current $i_2$ of the circuit A may be expressed by:

$$I_o = i_2\, 2^n$$

(4)

It should be noted that when deducing the two relationships (3) and (4) it has been assumed that the transistor $T_1$ and the transistor D connected as a diode have equal emitter surface areas and that the base current of the transistor $T_2$ is negligible with respect to the collector current of the transistor $T_1$.

The capacitor C is charged to a voltage which is equal to the voltage across the series connection of the diode D and the base emitter paths of the transistors $T_4$, $T_3$ and $T_2$. At the operating instant the shutter trigger of the camera incorporating the shutter system shown in FIG. 1 is pressed. As a result the switch $S_1$ is opened. Irrespective of further variations in the input current $i_2$ of the circuit A, the relationship between the output current $I_o$ and the last value of the input current $i_2$ prior to the said operating instant will be retained. This is so because the voltage across the storage capacitor C ensures that after the operating instant, the output current $I_o$ according to the expression (4) continues to flow, at least for a sufficient period of time, as will be set out hereinafter. After the mirror of the camera has lifted, the output current $I_o$ will flow through the integrating capacitor $C_o$ so that this capacitor is charged. The current will continue to flow up to the instant at which the voltage across the capacitor is equal to $V_{TR}$, i.e., the trigger voltage required to cause the flip-flop T to change state, causing the shutter of the camera to be closed again. A simple calculation shows that the time interval between the opening and the closing of the shutter, which is generally referred to as the exposure time, is equal to $$t' = C \cdot V_{TR}/\alpha \cdot i_2 2^n$$

(5)

where C is the value of the capacitor $C_o$, $\alpha$ is a constant, $V_{TR}$ is the trigger voltage of the flip-flop T, $i_2$ is the input current of the circuit A and $n = \frac{1}{3}(f+d)$. A comparison of the two expressions (1) and (5) shows that a proper selection of C, $V_{TR}$ and the constants $\alpha$ and $k'$ enables unity ratio between $t$ and $t'$ to be obtained.

When the switch $S_1$ is open, the storage capacitor C can only discharge at the base current of the transistor $T_2$. This current is many times smaller than the output current $I_o$. As a result, the capacitor C will be discharged with a time constant which is comparatively large compared with the time during which $I_o$ must be available. This means that always the storage time will automatically be far greater than the exposure time, so that a very small storage capacitor may be used.

The circuit A actually comprises two independent portions, a portion comprising the transistor $T_1$ and the voltage supply E and a portion comprising the transistors $T_2$, $T_3$, $T_4$ and the diode D. The first portion generates a voltage between the base of the transistor $T_1$ and the supply point $(-)$ in accordance with the input current $i_2$ and the voltage of the source E. The voltage produced is applied to the diode D which forms part of the second portion of the circuit. As a result, the correct current will flow through the diode, which current is equal to the output current $I_o$ according to equation (4). Thus, during the supply of the input current $i_2$ to the circuit A the correct output current $I_o$ is already delivered by the circuit. At the same time, the correct control voltage is automatically set up across the storage capacitor C in accordance with the value of this output current. This simultaneous production of the correct output current and of the correct control voltage prevents the generation of error voltages which occur in the aforedescribed known circuit owing to the stepped production of the output current.

The inclusion of the current source (D, $T_1$, E) in the negative-feedback loop of the amplifier ($T_2$, $T_3$, $T_4$) results in a constant current gain from the input to the output. If the input current of the amplifier is negligible with respect to the collector current of the transistor $T_1$, the output current $I_o$ will become substantially insensitive to variations in transistor parameters of the transistors $T_2$, $T_3$ and $T_4$. In addition, variations in the supply voltage of the amplifier have substantially no influence on the output current $I_o$. This means that the likelihood of error voltages due to variations in the transistor parameters or to variations in the supply voltage is also considerably reduced.

FIG. 2 shows a preferred embodiment of the circuit according to the invention. The switch $S_1$ of the circuit A shown in FIG. 1 has been replaced by a switching network comprising transistors $T_5$, $T_6$, $T_7$ and a diode $D_2$. The collector of the transistor $T_1$ is connected to the base of the transistor $T_2$ via the emitter collector path of the transistor $T_5$. The collector of the transistor $T_1$ is also connected, via the emitter collector path of the transistor $T_6$, to the input terminal I of the circuit which also, via the diode $D_2$, is connected to the base of the transistor $T_2$. The bases of the transistors $T_5$ and $T_6$ are connected to a point V to which a switching voltage is applied. The base of the transistor $T_5$ is connected via the collector emitter path of the transistor $T_7$ to the negative supply point (−) of the circuit. The base of the transistor $T_7$ is connected to a point X to which a switching voltage is applied.

In the operational condition of the circuit shown in FIG. 2 the point V is at a potential such that the transistors $T_5$ and $T_6$ are conductive. The point X is at a potential such that the transistor $T_7$ is non-conductive. In this situation the collector current from the transistor $T_1$ is equally divided between the transistors $T_5$ and $T_6$. If now the point X is raised to a potential such that the transistor $T_7$ becomes conductive, the transistor $T_5$ will be cut off. Hence the entire collector current of the transistor $T_1$ will flow through the transistor $T_6$.

Replacing the switch $S_1$ of the circuit A shown in FIG. 1 by the switching network of the circuit shown in FIG. 2 is of particular importance when very long exposure times of, for example, 10 seconds are to be realized. In this case the base current of the transistor $T_2$ will be in the order of a few pico-amperes. It will be understood that the connection between the collector of the transistor $T_1$ and the base of the transistor $T_2$ will then be highly sensitive to interference signals. Hence the use of a non-electronic switch in the said connection is deprecated. Moreover, the inclusion of a bipolar transistor in the said connection is also deprecated because the base current of this transistor interferes with satisfactory operation of the circuit at the said small base current of the transistor $T_2$. The use of the switching network shown in FIG. 2 causes the said disadvantages to be avoided.

FIG. 3 shows the layout of the circuit shown in FIG. 2. The input current for the circuit is applied to a contact area I which via a conducting path 8 is connected to a collector $k_6$ of the transistor $T_6$ and also to one electrode of the diode $D_2$. The other electrode of the diode $D_2$ is connected via a conducting path 11 to the collector $K_5$ of the transistor $T_5$ and also to the base $b_2$ of the transistor $T_2$. The conductor 11 is also connected to a terminal pad 7 to which the storage capacitor C may be connected. Base contact $b_6$ of the transistor $T_6$ is connected to a terminal pad 3 to which a voltage V may be applied. Emitter contact $e_6$ of the transistor $T_6$ is connected to the emitter contact $e_5$ of the transistor $T_5$ and also via the conductor 11 to collector contact $k_1$ of the transistor $T_1$. Base contact $b_5$ of the transistor $T_5$ is connected via a conducting path 9 to the collector contact $k_7$ of the transistor $T_7$ and also to one terminal of a resistor R, the other terminal of which is connected to a terminal pad 4. The latter pad may be connected to a voltage source V. Emitter contacts $e_2$ and $e_{22}$ are connected via a conducting path 12 to base contact $b_3$ of the transistor $T_3$. Emitter contact $e_3$ of the transistor $T_3$ is connected via a conducting path 13 to base contact $b_4$ of the transistor $T_4$. Collector contact $k_4$ of the transistor $T_4$ is connected to a terminal pad 0 from which the output signal may be derived. An emitter contact $e_4$ is connected via a conducting path 14 to base contact $b_1$ of the transistor $T_1$ and also to a terminal $k$ of the diode D. Emitter contact $e_1$ of the transistor $T_1$ is connected to terminal pad 6 to which a voltage source E may be connected. Emitter contact $e$ of the diode D is connected via a conducting path 15 to a contact opening $d_1$ and also to a terminal pad 5 to which the negative terminal of the voltage supply may be connected.

The transistors $T_1$ to $T_7$ are vertical transistors preferably of the npn-type. Hence, the p-type base region extends under the n-type emitter region provided with contacts $e_i$ ($i = 1, \ldots, 7$), while the n-type collector region in turn extends under the base region. At the points at which the three regions directly overlie each other a transistor action providing a comparatively large current gain is obtained. The collector regions of the transistors $T_2$ and $T_3$ form part of a large n-type island 110 which via a contact opening $d_2$ is connected to a terminal pad 1 to which the positive terminal of the voltage supply source may be connected. The collector regions of the transistors $T_1$, $T_4$, $T_5$, $T_6$ and $T_7$ form part of n-type islands 70, 60, 50, 30 and 20, respectively. The circuit described may be manufactured with the use of photolithographic etching methods commonly used in semi-conductor technology in conjunction with epitaxial growth techniques and doping methods such as, for example, diffusion, as the case may be of doped-out oxide, or ion implantation.

As will be seen from the layout, the emitter areas of the transistors $T_1$, $T_4$, $T_3$ and $T_2$ in this order each are larger than the preceding one. These proportions are used to improve the frequency characteristic of the amplifier. It ensures that the amplifier gain is determined by a single large time constant, which means a phase shift of 90° only. Measurements made on a practical embodiment of the integrated circuit have shown that the amplifier actually is stable at any gain between unity and $10^4$, which implies that the amplifier may completely be provided with negative feedback without the need for special steps.

Obviously, the invention is not restricted to the examples described and for one skilled in the art many variations are possible without departing from the scope of the invention. For example, in the embodiments shown a Darlington amplifier is used. However, other types of amplifier may also be employed. The single requirement such an amplifier has to satisfy is that the input impedance must be large enough to permit the slow discharge of the storage capacitor C during the control time of the circuit. Furthermore, in the embodiment shown a simple current mirror ($T_1$, D) is used. It will be appreciated that alternatively other current mirrors may be employed. In addition, in the embodiment described the circuit according to the invention is used in a shutter system for an automatic photographic camera. However, there are other possible uses, for example, in automatic printing systems for printing film negatives or in exposure meters. Moreover, the diode D may be directly connected to the input I of the circuit A.

What is claimed is:

1. Integrated circuit for producing an output current having a predetermined non-linear relationship to an input current comprising, an input terminal adapted to receive said input current and an output terminal for supplying said output current, an amplifier provided with negative feedback and having an input circuit and an output circuit from which the output current is derived, a switch, means connecting the negative-feedback impedance via said switch from the amplifier output circuit to the input circuit of the amplifier so that the negative feedback impedance determines the prescribed non-linear relationship between the input and output currents, means including said switch for selectively coupling the amplifier input circuit to said input terminal, means for coupling said output terminal to the amplifier output circuit, and means for connecting said amplifier input circuit to a storage capacitor for maintaining said predetermined non-linear relationship when the switch is opened at a given operating instant and at the last value of the input current prior to the operating instant and irrespective of further variations of the input current.

2. Integrated circuit as claimed in claim 1, wherein the negative-feedback impedance comprises a current source which includes at least a diode and a transistor, the diode being connected in parallel with the base emitter circuit of the transistor.

3. Integrated circuit as claimed in claim 1 characterized in that the input current is supplied to a junction point between the switch and the negative-feedback impedance.

4. Integrated circuit as claimed in claim 1 including a diode and an auxiliary transistor connected so that the input current is supplied via said diode to the input circuit of the amplifier and also via the collector emitter path of said auxiliary transistor to the negative-feedback impedance.

5. Integrated circuit as claimed in claim 2 wherein the switch comprises an electronic switch and the amplifier includes a plurality of other transistors the base emitter paths of which are connected in series, means connecting the end of said series combination remote from the input of the amplifier via said diode to a voltage supply point, means connecting the collector of the transistor of the negative-feedback impedance to said electronic switch and its emitter via a voltage source, which delivers a voltage which determines the prescribed non-linear relationship, to said voltage supply point, and means connecting the base of said transistor to the junction point of the diode and said remote end of said series combination.

6. Integrated circuit as claimed in claim 5, characterized in that the emitter surface area of the transistor of the negative-feedback impedance and the emitter surface areas of the other transistors, reckoned from the diode junction point, increase progressively in the said order.

7. An integrated circuit as claimed in claim 2 wherein said input terminal is connected to a junction point between the switch and the negative-feedback impedance to supply said input current thereto.

8. An integrated circuit as claimed in claim 2 including a second diode and a second transistor connected so that the input current is supplied via said second diode to the amplifier input circuit and via the second transistor to the transistor of said negative-feedback impedance.

9. A non-linear amplifier circuit comprising, an input terminal adapted to receive an input signal, an output terminal adapted to supply an output signal having a non-linear relationship to the input signal, switching means, an amplifier with its input coupled to the input terminal via said switching means and its output coupled to its input via a negative feedback circuit and said switching means, said negative feedback circuit including current source means providing constant current gain from the amplifier input to the output thereby determining the non-linear relationship between the input and output signals, means for coupling the amplifier output to said output terminal, and a storage capacitor connected to the amplifier input independently of the condition of the switching means for storing a voltage determined by the input signal just prior to the opening of said switching means at the start of an operating time interval of the amplifier circuit.

10. An amplifier circuit as claimed in claim 9 wherein said current source means comprises a transistor with its base electrode coupled to the amplifier output and a diode connected across the base-emitter circuit of the transistor.

11. An amplifier circuit as claimed in claim 10 wherein said current source means further comprises a source of DC voltage coupled to the emitter of the transistor to supply thereto a voltage which determines the non-linear relationship of said input and output signals.

12. An amplifier circuit as claimed in claim 9 wherein said switching means comprises a diode connected between the input terminal and the amplifier input and a transistor connected between said input terminal and the output of the negative feedback circuit.

13. An amplifier circuit as claimed in claim 9 wherein said amplifier comprises at least two transistors connected in a Darlington configuration.

14. An amplifier circuit as claimed in claim 9 for use in a photographic camera or exposure meter and further comprising, a light sensitive element for supplying said input signal to the input terminal, an integrating capacitor coupled to the output terminal, and a trigger circuit coupled to the output terminal and responsive to the output signal thereat to change state at a given value thereof to operate the camera shutter.

* * * * *